US006218455B1

United States Patent
Smith et al.

(10) Patent No.: US 6,218,455 B1
(45) Date of Patent: Apr. 17, 2001

(54) VINYL ACETATE/ETHYLENE PAINT LATICES STABILIZED WITH URETHANE LINKED POLY(ETHYLENE GLYCOLS) AND POLYOXYETHYLENE-POLYOXYALKYLENE GLYCOLS

(75) Inventors: Carrington Duane Smith, Milford Square; Robert James Klein, Newtown, both of PA (US)

(73) Assignee: Air Products Polymers, L.P., Allentown, PA (US)

( * ) Notice: Subject to any disclaimer, the term of this patent is extended or adjusted under 35 U.S.C. 154(b) by 0 days.

(21) Appl. No.: 09/313,940

(22) Filed: May 19, 1999

(51) Int. Cl.$^7$ .................................................. C08L 31/04
(52) U.S. Cl. ........................................... 524/457; 524/822
(58) Field of Search .......................... 524/822, 457; 526/331

(56) References Cited

U.S. PATENT DOCUMENTS

| | | | |
|---|---|---|---|
| 3,734,819 | * | 5/1973 | Knutson ............................... 161/254 |
| 4,190,566 | | 2/1980 | Noll et al. ......................... 260/29.2 TN |
| 4,283,320 | | 8/1981 | Carroll et al. ..................... 260/29.6 RW |
| 4,927,876 | | 5/1990 | Coogan et al. ........................ 524/457 |
| 5,314,942 | | 5/1994 | Coogan et al. ........................ 524/457 |
| 5,530,056 | | 6/1996 | Farwaha et al. ...................... 524/558 |

FOREIGN PATENT DOCUMENTS

| | | |
|---|---|---|
| WO94/13726 | 6/1994 | (WO) . |
| WO96/28489 | 9/1996 | (WO) . |

OTHER PUBLICATIONS

S. T. Eckerley and B. J. Helmer, "Mechanistic Considerations of Particle Size Effects on Film Properties of Hard/Soft Latex Blends", J. Coatings Technology, 69(864), 97–107 (1997), No Month.

M. A. Winnik and J. Feng, "Latex Blends: an Approach to Zero VOC Coatings" J. Coatings Technology, 68(852), 39–50(1996), No Month.

* cited by examiner

*Primary Examiner*—David W. Wu
*Assistant Examiner*—Kelechi Egwim
(74) *Attorney, Agent, or Firm*—Russell L. Brewer

(57) ABSTRACT

This invention relates to improved vinyl acetate/ethylene copolymers emulsions polymerized in the presence of colloidal, nonionic, water dispersible polyurethanes. The improvement resides in polymerizing the vinyl acetate and ethylene in the presence of a costabilizer comprised of the colloidal, nonionic, water dispersible polyurethanes and a polyoxyethylene-polyalkylene glycol, a particularly polyoxyethylene-polyoxypropylene glycols.

16 Claims, No Drawings

VINYL ACETATE/ETHYLENE PAINT LATICES STABILIZED WITH URETHANE LINKED POLY(ETHYLENE GLYCOLS) AND POLYOXYETHYLENE-POLYOXYALKYLENE GLYCOLS

BACKGROUND OF THE INVENTION

Waterborne vinyl acetate/ethylene (VAE) polymers prepared by emulsion polymerization are extremely important commercial materials for use in paint and adhesive formulations. Because of the dual phase nature of these materials, they require a stabilizing package to maintain water dispersibility. Conventionally, stability is maintained through the addition of surfactants or water soluble polymers such as polyvinyl alcohol or cellulose.

A goal in producing one type of vinyl acetate/ethylene copolymers for paint applications, including semi-gloss, is one of simultaneously providing low minimum film forming temperature (MFFT) in the emulsion and block resistance in a paint incorporating the emulsion. One generally seeks a minimum film forming temperature (MFFT) of less than 5° C. in the emulsion and high block resistance values in the paint. Block resistance is the measure of the adhesiveness of the paint to itself after drying. When a paint which has low block resistance is applied to two substrates and the two substrates come into contact, the two substrates will adhere to one another.

In order to reduce MFFT and retain high block resistance, solvents traditionally have been added to the paint formulations. Many solvents are considered volatile organic compounds (VOC) and therefore undesirable from an environmental perspective. Solvents act to lower the MFFT of the emulsion polymer by temporarily reducing the glass transition temperature. On evaporation of the solvent, the paint becomes block resistant by virtue of the hardness of the polymer. Without solvent added, the high Tg of the polymer prevents film coalescence.

Emulsion polymers have been prepared in the presence of water dispersible polyurethanes. Typically, these polymers are referred to as hybrids combining features of each while differing from the features of blends. For the most part, such water dispersible polyurethanes have been anionic polyurethanes incorporating amine neutralized carboxyl functionality. More recently, some nonionic polyurethanes have been utilized to stabilize the emulsion polymerization of a variety of monomers.

Representative patent literature which show water dispersible polyurethane/hybrid systems and mixtures of water dispersible polyurethanes and vinyl and acrylic emulsions are as follows:

U.S. Pat. No. 4,927,876 discloses two types of aqueous polymer dispersions for use as coating compositions. The dispersions comprising a water dispersible polyurethane containing diphenylmethane diisocyanate and a vinyl polymer. The water dispersible polyurethane component is prepared by forming an isocyanate terminated prepolymer having carboxyl functionality incorporated therein and chain extending with an amine. In forming the aqueous dispersion, the vinyl polymer may be blended with the water dispersible polyurethane or a vinyl monomer may be polymerized in the presence of the aqueous polyurethane dispersion. A variety of monomers suited for polymerization are suggested and these include acrylates and hydroxyacrylates.

U.S. Pat. No. 4,190,566 discloses nonionic, water dispersible polyurethanes having a linear molecular structure. The nonionic, water dispersible polyurethanes are formed by reacting organic diisocyanates with difunctional organic compounds having molecular weights from about 300 to 6,000 in the presence of components having hydrophilic groups, e.g., conventional polyether and polyester polyols, guaranteeing the dispersibility of the polyurethanes. The hydrophilic components are based on reacting alkylene oxides with monofunctional alcohols or any alternative reacting monoisocyanate with the polyether alcohol. Optionally, the water dispersible polyurethanes may be blended with other vinyl polymers for the formulation of coatings.

WO 94/13726 discloses a class of hydrophilic polyurethanes which are water dispersible and useful as protective colloids in combination with conventional nonionic surfactants for use in stabilizing the emulsion polymerization of monomers such as vinyl acetate and vinyl chloride. These polyurethanes are high viscosity, water dispersible polyurethanes, and these are formed by reacting aliphatic or aromatic diisocyanates with polyethylene glycols. The latter are polyaddition products of ethylene oxide and a variety of divalent alcohols, a representative is the reaction product of a polyethylene glycol and meta-tetramethylxylene diisocyanate. The patent also discloses the use of these high viscosity polyurethanes in producing polyvinyl acetate water-resistant films.

WO 96/28489 and its equivalent, DE 195 08 856, disclose the use of water soluble-nonionic polyurethanes as protective colloids of the type described in WO 94/13726 for the emulsion polymerization of a variety of monomers. Representative monomers suited for forming aqueous dispersions include acrylic and methacrylic acid esters, acrylic and methacrylic acids as well as their hydroxy alkyl esters, vinyl acetate and copolymers of vinyl acetate and ethylene. The patentees also point out that redispersible powders can be obtained from these emulsions. Representative examples then show the use of the water soluble polyurethanes as protective colloids alone and in combination with surfactants for the polymerization of ethylene, vinyl acetate and N-methylolacrylamide.

U.S. Pat. No. 5,314,942 discloses the preparation of aqueous polymer dispersion containing vinyl polymer and a nonionic water-dispersible polyurethane having pendent polyoxyethylene chains as a stabilizer in emulsion polymerization. The nonionic polyurethanes having pendent polyoxyethylene chains are alleged to possess significant advantages over the anionic polyurethanes described in the art. Most of the examples show the polymerization of acrylic monomers in the presence of the nonionic polyurethane dispersion and sodium lauryl sulfate.

Representative literature and patents regarding minimum film forming temperature emulsions and block resistant paints are as follows:

S. T. Eckersley and B. J. Helmer, "Mechanistic Considerations of Particle Size Effects on Film Properties of Hard/Soft Latex Blends," J. Coatings Technology, 69(864), 97–107(1997). This article describes the use of appropriate weight ratios of hard and soft latices to yield coatings with improved block resistance and low MFFT. Low levels of small particle size hard latexes when blended with larger particle size soft latexes yielded optimum properties due to packing considerations.

M. A. Winnik and J. Feng, "Latex Blends: an Approach to Zero VOC Coatings," J. Coatings Technology, 68(852), 39–50(1996). This article describes the use of appropriate weight ratios of hard and soft latices to yield coatings with improved block resistance and low MFFT. Low levels of small particle size hard latexes when blended with larger particle size soft latexes yielded optimum properties due to packing considerations and longer drying times.

U.S. Pat. No. 4,283,320 discloses addition of a methacrylic acid—styrene (hard) copolymer to a VOC containing semigloss paint formulation incorporating a soft latex for improving block resistance.

U.S. Pat. No. 5,530,056 describes use of a poly(ethylene glycol) mono(meth)acrylate macromonomer with a molecular weight from about 175–1100 g/mole in an acrylic monomer containing emulsion to impart freeze-thaw stability and block resistance to the final coating.

U.S. Pat. No. 5,426,129 discloses reactive coalescents incorporated into emulsion polymers post-polymerization which allow for film formation followed by crosslinking.

BRIEF SUMMARY OF THE INVENTION

This invention relates to improved vinyl acetate/ethylene emulsions incorporating polymerized units of vinyl acetate and ethylene, as well as optional monomers, polymerized in the presence of a colloidal, nonionic, water dispersible polyurethane stabilizer for use in formulating block resistant paints. The improvement resides in vinyl acetate and ethylene emulsions polymerized in the presence of a costabilizer comprised of:

a) a colloidal water dispersible nonionic polyurethane; and, b) a polyoxyethylene-poly(oxyalkylene) glycol block copolymer, preferably, a polyoxyethylene-polyoxypropylene glycol. The improved vinyl acetate/ethylene emulsions provide for the following:

an ability to provide for water-resistant vinyl acetate/ethylene based paints;

an ability to form freeze-thaw stable vinyl acetate/ethylene paints;

an ability to form vinyl acetate/ethylene emulsions having a low minimum film forming temperature;

an ability to form paints incorporating vinyl acetate/ethylene latices and VAE based paints having excellent block resistance; and, an ability to produce low volatile organic compound (VOC) vinyl acetate/ethylene based paints.

BRIEF DESCRIPTION OF SEVERAL VIEWS OF THE DRAWINGS

Not Applicable

DETAILED DESCRIPTION OF THE INVENTION

Vinyl acetate/ethylene emulsions have been widely used as latices for paint applications. These vinyl acetate/ethylene emulsions broadly contain from 5 to 40% by weight of ethylene, typically from about 15 to 30% by weight ethylene, and have a glass transition temperature of from about −10 to 10° C. Optionally, other ethylenically unsaturated monomers may be copolymerized with the vinyl acetate and ethylene. Generally the vinyl acetate/ethylene emulsions should include from 0 to 15% by weight of ethylenically unsaturated monomer. Preferably less than from 5% by weight of optional ethylenically unsaturated monomers are included as polymerized units in the VAE copolymer.

Ethylenically unsaturated monomers which can be copolymerized with vinyl acetate and ethylene include esters of acrylic and methacrylic acids, higher esters of vinyl alcohol and substituted styrenes. Specific examples of optional ethylenically unsaturated monomers include styrene, substituted styrenes, and the lower alkyl ($C_1$–$C_8$) esters of methacrylic, acrylic acids, and $C_4$–$C_{10}$ mono and di esters of maleic acid. Examples of lower alkyl acrylic esters include methyl acrylate, methyl methacrylate, ethyl acrylate, butyl acrylate and butyl methacrylate and 2-ethylhexyl acrylate. Others acrylic esters include 2-hydroxyethyl acrylate, and hydroxypropyl acrylate. Preferred esters of maleic acid include dioctyl maleate and dibutyl maleate.

VAE emulsions for paints often include polymerized monomer units which enhance wet adhesion, i.e., the ability of the paint to adhere to a previously painted surface. Examples of wet adhesion monomers are set forth in U.S. Pat. No. 4,219,454 and referenced patents and thus are incorporated by reference. Representative compositions include N-β-alkylaminoethyl ethylene urea and allyl-N-methyl-N-β-(1-ethylene ureido)-ethyl carbamate. They are usually added in amounts from 0.25–5% by weight of the polymer.

The stabilizer system used for the emulsion polymerization of vinyl acetate/ethylene is key to obtaining improved vinyl acetate/ethylene emulsions for use in paint applications and the stabilizer system is comprised of (1) a nonionic water-dispersible polyurethane emulsion formed by the reaction of an organic diisocyanate and water soluble polyethylene glycols or the water soluble polyglycol adduct of an alcohol and (2) a polyoxyethylene-polyoxyalkylene glycol block copolymer, e.g., a polyoxyethylene-polyoxypropylene glycol block copolymer.

The nonionic, water dispersible polyurethanes employed as protective colloids are of the type described WO 94/13726 and comprise the reaction product of an aliphatic or aromatic diisocyanate and a hydrophilic component and they are incorporated by reference. More specifically, the polyisocyanates used in making the nonionic, water dispersible polyurethane prepolymer include aliphatic, cycloaliphatic, araliphatic or aromatic polyisocyanates. Examples of suitable polyisocyanates include tetramethylxylylene diisocyanate, isophorone diisocyanate, cyclohexane-1,4-diisocyanate, 4,4'-dicyclohexylmethane diisocyanate, 3,3-dimethyl-4,4-di(aminocyclohexyl) methane diisocyanate, hexamethylene diisocyanate, dodecamethylene diisocyanate, 1,4-phenylene diisocyanate, 2,4-toluene diisocyanate, 2,6-toluene diisocyanate, 4,4'-diphenylmethane diisocyanate, 2,4-diphenylmethane diisocyanate, m-xylylene diisocyanate, 1,4-diisocyanatobenzene, polymethylene polyphenyl polyisocyanates and 1,5-naphthalene diisocyanate The hydrophilic component which is reacted with the polyisocyanate to form the nonionic polyurethane is based upon polyethyleneoxides and adducts of polyethyleneoxides with water and/or alcohols. To be water-soluble, generally at least 70 weight percent of the polyol component is comprised of ethylene glycol units. Some portion of the alkanol may be hydrophobic and thus the nonionic polyurethane may be the reaction product of ethylene oxide and $C_{2-4}$ divalent alcohols. These include ethylene glycol, butane diol, propylene glycol, and so forth. Polyvalent alcohols may be included for purposes of viscosity adjustment. Ethylene glycols having number average molecular weights in the range of 500–100,000, preferably 1000 to 20,000 and especially 3000 to 12,000 are typically used as the polyols. In preferred stabilizers, branched polyols such as trimethylol propane, glycerin, pentaerythritol, and the like are employed to increase molecular weight. The level of higher polyols, e.g., hydroxy functionality greater than 3 is normally within a range of from 0.5 to 1.5% by weight.

Polyoxyethylene-polyoxyalkylene glycol block copolymers constitute the other component of the stabilizing system. The polyoxyalkyene copolymers are selected from the group consisting of poly(oxypropylene) and poly(oxybutylene) glycol. For purposes of discussion the term polyoxyethylene-polyoxypropylene often is used herein for convenience, and also, it is the preferred component of the stabilizer system. One class includes non-ionic emulsifying agents known as "Pluronics." The "Pluronics" have the general formula:

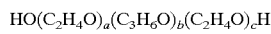

where a, b, and c are integers of 1 or above. As b increases, the compounds become less water soluble or more oil soluble and thus more hydrophobic when a and c remain substantially constant. Some examples of non-ionic emulsifying agents sold under the Pluronic trademark which can be used include polyoxyethylene-polyoxypropylene glycols conforming to the above general formula for "Pluronics" in which the polyoxypropylene chain has a molecular weight of 1500 to 1800 and the polyoxyethylene content is from 40 to 50 percent of the total weight of the molecule, a polyoxypropylene having a cloud point of about 140° F. and marketed under the trademark "Pluronic L-64,"; a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of the molecule and having a cloud point of about 212° F. and marketed under the trademark "Pluronic F-68. "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

The other type of block copolymer is a poly(oxyethylene)-poly(oxybutylene) copolymer. A series of these block copolymers are sold under the trademark Dow Polyol B-series.

In the formulation of the stabilizer system, the stabilizer system is used in the emulsion polymerization in an amount of from about 3 to 10% based on the weight of the vinyl acetate changed to the polymerization or, stated in the alternative, from 2 to 6% by weight of the emulsion which includes water. The percentages of the water dispersible, polyurethane in the stabilizer system will range from about 15 to 75%, preferably 40 to 60% by weight. Conversely, the percentages of polyoxyethylene-polyoxypropylene glycol block copolymers in the stabilizer system will range from about 85 to 25%, preferably 60 to 40% by weight. In preferred systems, the stabilizer consists essentially of the two components.

Although minor amounts of other nonionic stabilizer may be included, generally the stabilizer system consists essentially of the nonionic polyurethane and the block copolymer.

Polymerization of the ethylenically unsaturated monomers in the presence of the stabilizer comprised of the colloidal water dispersible nonionic polyurethane dispersion and polyoxyethylene-polyoxypropylene glycol block copolymer is effected via free radical polymerization. Redox systems comprising reducing agents and oxidizing agents (free radical initiators) are well known in the polymerization art. Hydrogen peroxide can be used or it can be replaced by organic hydroperoxides, for example tertiary butyl hydroperoxide. Reducing agents include sodium formaldehyde sulfoxylate, ascorbic acid, sodium metabisulfite and so forth. Other redox systems are known in polymerization art as well as thermal initiators, such as peroxydisulfates can be used.

The free radical polymerization of the monomer mixture is conducted at an elevated temperature, namely a temperature sufficient to liberate free radicals at a rate that sustains the polymerization reaction. A suitable temperature range is from 50° C. to 90° C., preferably 55° C. to 80° C.

The order of addition monomer and stabilizer may vary in accordance with standard polymerization procedures. For example, one procedure can utilize initial and delay addition of vinyl acetate along with an initial and delay of the colloidal polyurethane dispersant or the block copolymer. Also one can initially batch the polyurethane of block copolymer into the reactor and then delay the monomer along with polyurethane or block copolymer.

The resulting copolymer formed in accordance with the polymerization procedures described above generally will have a weight average molecular weight from 150,000–850,000.

Semi-gloss and other paint formulations may be developed in accordance with accepted procedures. Common ingredients include pigments, organic and inorganic, flow levelers, freeze-thaw additives and so forth. Other ingredients commonly used in paint formulations can be added to the formulation to tailor properties as desired.

The following examples are provided to illustrate various embodiments of the invention and are not intended to restrict the scope thereof.

EXAMPLE 1

Preparation of Vinyl Acetate-Ethylene Copolymers Stabilized with Urethane Linked Poly(Ethylene Glycols) And Polyoxyethylene-Polyoxypropylene Glycol Block Copolymer General Procedure The following is a general procedure for preparing VAE copolymer emulsions using a 1 gallon stainless steel pressure reactor:

The reactor is charged with an initial mixture such as the one shown below:

| Initial Mixture | |
| --- | --- |
| Material | Mass charged in grams |
| DI Water | 1000 |
| Ferric Ammonium Sulfate (5% aqueous solution) | 3.0 |
| Disponil PC 16 (40% Aqueous solution) | 146 |
| 50% Citric acid aqueous solution | 1.96 |
| Sodium Citrate | 1.0 |
| Monomer Mix (see delay table) | 190 |

Disponil PC-16 is a colloidal polyurethane stabilizer based urethane linked tetramethylxylene diisocyanate and poly(ethylene glycol) and is marketed by Henkel.

The following delay mixtures are utilized:

| Delay Mixtures | |
|---|---|
| Redox System | Mass charged in grams |
| Aqueous 1.0% t-BHP | 165 |
| Aqueous 2.5% sodium erythorbate | 165 |
| Monomer Mixture* | 1787 total composed of: |
| Vinyl Acetate | 1677 |
| Butyl Acrylate | 42 |
| Pluronic L-64 | 17 |
| Pluronic F-68 | 51 |
| Ethylene | 236 |

*Note that 190 grams of this mixture is the initial charge

Pluronic L-64; is a polyoxyethylene-polyoxypropylene glycols in which the polyoxypropylene chain has a molecular weight of 1500 to 1800 and the polyoxyethylene content is from 40 to 50 percent of the total weight of the molecule, a polyoxypropylene having a cloud point of about 140° F.

Pluronic F-68, is a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of the molecule and having a cloud point of about 212° F.

Colloidal Polyurethane in Initial Mixture and Block Copolymer Delayed

In the general polymerization procedure the initial distilled water mixture is adjusted to pH 4.3 with the citric acid. Ferric ammonium sulfate is added and the initial aqueous solution is added to the previously nitrogen purged 1 gallon reactor. Next, agitation at 200 rpm is begun and 190 grams of the monomer mixture was charged. The agitation is increased to 300 rpm and the mixture is heated to 55° C. The aqueous t-BHP and sodium erythorbate solutions are added at a rate of 0.2 ml/min and 0.4 ml/min, respectively. About 15 minutes after initiation occurred, the flows of the aqueous t-BHP and sodium erythorbate solutions are terminated. At this point, 140 gms of monomer mix and 121 grams of ethylene are added to a pressure of 500 psig. The aqueous t-BHP and sodium erythorbate solutions are again started, both at 0.4 ml/min. At reinitiation, the remaining monomer mixture feed is begun and the ethylene pressure is maintained at 500 psi for three hours. The aqueous t-BHP and sodium erythorbate solutions feed rates are adjusted to maintain the free vinyl acetate in the reaction within a range of 6–10% by weight. The agitation rate is increased to 400 rpm at 90 minutes, to 550 rpm at 120 minutes and to 700 rpm at 150 minutes. When the free vinyl acetate is less than 1.5%, the delay feeds are stopped. Next, the reaction is cooled to 30° C. and transferred to a degasser. During this transfer, the agitation rate in the degasser is 200 rpm. 2 gms Colloid 675 are added in a small amount of water.

Numerous properties of the resulting emulsion are measured and reported in Table 1 as follows:

TABLE 1

| Urethane In Initial Mixture Property | Block copolymer in Delay Value |
|---|---|
| Accel Seds % | 1 |
| Tg onset (deg C.) | −4 |
| Viscosity (60/12 RPM) (cps)* | 1064/2700 |
| 100/325 mesh coagulum (ppm) | 102/142 |

TABLE 1-continued

| Urethane In Initial Mixture Property | Block copolymer in Delay Value |
|---|---|
| % solids | 54.9 |
| pH | 4.5 |
| Freeze Thaw Cycles | 5 |

*Brookfield viscosity #60 spindle, 12 RPM at 25° C.

Comparative Example 2

Vinyl Acetate-Ethylene Copolymers Stabilized with Hydroxyethyl Cellulose, Alkylphenol Ethoxylate And Polyoxyethylene-Polyoxypropylene Glycol HEC and Surfactant in Initial Mixture—Block Copolymer Delay The general procedure for preparing VAE copolymer emulsions using a 1 gallon stainless steel pressure reactor as set forth in Example 1 was followed with the exception of stabilizer and mode of addition.

| | Mass charged in grams |
|---|---|
| Initial Mixture | |
| Material | |
| DI Water | 1100 |
| Ferric Ammonium Sulfate (5% aqueous solution) | 3.0 |
| Igepal CO-887 (70% solution in water) | 43.7 |
| Igepal CO-630 | 10.4 |
| Natrosol 250LR (2% solution in water) | 100 |
| 50% Citric acid aqueous solution | 1.96 |
| Sodium Citrate | 1.0 |
| Monomer Mix (see delay table) | 190 |
| Delay Mixtures | |
| Aqueous 1.0% t-BHP | 165 |
| Aqueous 2.5% sodium erythorbate | 165 |
| Monomer Mixture* | 1719 total composed of: |
| Vinyl Acetate | 1677 |
| Butyl Acrylate | 42 |
| Pluronic L-64 | 17 |
| Pluronic F-68 | 51 |
| Ethylene | 236 |

*Note that 190 grams of this mixture is the initial charge

Igepal CO-887 is polyoxyethylene nonyl, phenyl ether (cloud point above 212° F.).

Igepal CO-630 is polyoxyethylene nonyl phenyl ether (cloud point 126–133° F.) (collectively often referred to as APE).

Natrosol 250LR is a commercial hydroxyethyl cellulose derivative.

Numerous Properties of the Resulting Emulsion were Measured and Reported in Table 2

TABLE 2

| HEC and Surfactant in Initial Mixture - Block Copolymer Delay | |
|---|---|
| Property | Value |
| Accel Seds % | 2.5 |
| Tg onset (deg C.) | −6.1 |
| Viscosity (60/12 RPM) (cps) | 1156/3020 |
| 100/325 mesh coagulum (ppm) | 80/398 |
| % solids | 55.4 |

TABLE 2-continued

HEC and Surfactant in Initial Mixture - Block Copolymer Delay

| Property | Value |
| --- | --- |
| pH | 4.4 |
| Freeze Thaw Cycles | 0 |

Comparative Example 3

Preparation Of Vinyl Acetate-Ethylene Copolymers Stabilized with Urethane Linked Poly(Ethylene Glycol) and Alkylphenol Ethoxylate The following is a general procedure for preparing VAE copolymer emulsions using a 1 gallon stainless steel pressure reactor: The attempt was to duplicate patent Example 2 WO 96/28489. The procedure of Example 1 was followed with the exception of stabilizer and mode of addition.

Polyurethane and Surfactant in Initial Mixture - Polyurethane Delay

| Material | Mass charged in grams |
| --- | --- |
| *Initial Mixture* | |
| DI Water | 850 |
| Ferric Ammonium Sulfate (5% aqueous solution) | 3.0 |
| Igepal CO-887 (70% aqueous solution) | 43.7 gms |
| Igepal CO-630 | 10.4 gms |
| Disponil PC 15 (40% Aqueous solution) | 58 |
| 50% Citric acid aqueous solution | 1.96 |
| Sodium Citrate | 1.0 |
| Monomer Mix (see delay table) | 190 |
| *Delay* | |
| Redox | |
| Aqueous 1.0% t-BHP | 165 |
| Aqueous 2.5% sodium erythorbate | 165 |
| Monomer Mixture* | 1719 total composed of: |
| Vinyl Acetate | 1677 |
| Butyl Acrylate | 42 |
| Polyurethane mixture: | |
| Disponil PC-15 (40% aqueous solution) | 87.6 |
| DI Water | 150 |
| Ethylene | 236 |

*Note that 190 grams of this mixture is the initial charge

Numerous properties of the resulting emulsion were measured and reported in Table 3:

TABLE 3

Polyurethane and Surfactant in Initial Mixture - Polyurethane Delay

| Property | Value |
| --- | --- |
| Accel Seds % | 1 |
| Tg onset (deg C.) | −1.7 |
| Viscosity (60/12 RPM) (cps) | 3820/9200 |
| 100/325 mesh coagulum (ppm) | 326/241 |
| % solids | 54.9 |
| pH | 4.4 |
| Freeze Thaw Cycles | 0 |

Comparative Example 4

Preparation Of Vinyl Acetate-Ethylene Copolymers Stabilized with Urethane Linked Poly(Ethylene Glycols) And Alkylphenol Ethoxylate The following is a general procedure for preparing VAE copolymer emulsions using a 1 gallon stainless steel pressure reactor with the exception of the stabilizer and mode of addition: The attempt is to duplicate patent Example B2 in WO/96/28489 employing the procedure of Example 1 herein.

Surfactant in Initial Mixture and Polyurethane Delay

| Material | Mass charged in grams |
| --- | --- |
| *Initial Mixture* | |
| DI Water | 850 |
| Ferric Ammonium Sulfate (5% aqueous solution) | 3.0 |
| Igepal CO-887 (70% aqueous solution) | 43.7 gms |
| Igepal CO-630 | 10.4 gms |
| 50% Citric acid aqueous solution | 1.96 |
| Sodium Citrate | 1.0 |
| Monomer Mix (see delay table) | 190 |
| *Delay* | |
| Redox | |
| Aqueous 1.0% t-BHP | 165 |
| Aqueous 2.5% sodium erythorbate | 165 |
| Monomer Mixture* | 1787 total composed of: |
| Vinyl Acetate | 1677 |
| Butyl Acrylate | 42 |
| Polyurethane mixture: | |
| Disponil PC-15 (40% aqueous solution) | 146 |
| DI Water | 150 |
| Ethylene | 236 |

*Note that 190 grams of this mixture is the initial charge

Numerous properties of the resulting emulsion were measured and are reported in Table 4:

TABLE 4

Surfactant in Initial Mixture and Polyurethane Delay

| Property | Value |
| --- | --- |
| Accel Seds % | 0.5 |
| Tg onset (deg C.) | −4.5 |
| Viscosity (60/12 RPM) (cps) | 702/1320 |
| 100/325 mesh coagulum (ppm) | 34/382 |
| % solids | 53.1 |
| pH | 5.3 |
| Freeze Thaw Cycles | 0 |

Summarizing the stabilizer composition and mode of addition of the stabilizer system and compared to a control, Examples 1–4 refer to the following Table 5

TABLE 5

| Example | Initial Stabilizer(s) | Delayed Stabilizer(s) |
| --- | --- | --- |
| Example 1 | PUR (3%) | Pluronics (3%) |
| Comparative Example 3 | PUR/APE (1%/2%) | PUR (3%) |
| Comparative Example 4 | APE (2%) | PUR (2%) |

TABLE 5-continued

| Example | Initial Stabilizer(s) | Delayed Stabilizer(s) |
|---|---|---|
| Comparative Surfactant/Pluronic Example 2 | APE (2%) | Pluronics (3%) |

Comparative Example 5

Preparation Of Vinyl Acetate-Ethylene Copolymers Stabilized Solely with Urethane Linked Poly (Ethylene Glycols)

In carrying out the polymerization, using urethane linked polyethylene glycol as the sole stabilizer and introduced both in the initial mixture and delay, this emulsion coagulated in the reactor and no subsequent testing was performed. It is interesting that batch VAE may be successfully stabilized solely by PUR, but in a delay monomer fashion, this apparently is not the case.

EXAMPLE 6

Testing of VAE Emulsions in Paint Formulations

A series of vinyl acetate/ethylene emulsions were prepared in accordance with the general procedures of Examples 1–6. These emulsions were then tested in identical semi-gloss type paint formulations and block resistance was measured according to ASTM D4946-89 on 6 mil thick films.

In preparing the paint, a grind paste was prepared and then mixed with the designated emulsion. The following grind, paste and paint formulation was used to prepare the Low VOC semi-gloss coating tested for freeze-thaw stability, minimum film forming temperature and block resistance. Table 6 sets forth the results of the tests,

| Grind Paste Formulation | | | | |
|---|---|---|---|---|
| Grind Paste: | A | B | C | D |
| Water | 29.17 | 29.17 | 29.17 | 29.17 |
| Tamol 1124 | 1.25 | 1.25 | 1.25 | 1.25 |
| Triton CF-10 | 0.63 | 0.63 | 0.63 | 0.63 |
| TI-Pure R-706 | 67.50 | 67.50 | 67.50 | 67.50 |
| Potassium Carbonate | 1.00 | 1.00 | 1.00 | 1.00 |
| Bubble Breaker 625 | 0.50 | 0.50 | 0.50 | 0.50 |
| Kathon LX 1.5% | 0.25 | 0.25 | 0.25 | 0.25 |
| Bubble Breaker 625 | 0.50 | 0.50 | 0.50 | 0.50 |
| Aerosol OT-100 (10%) | 6.25 | 6.25 | 6.25 | 6.25 |
| Water | 19.80 | 19.80 | 19.80 | 19.80 |
| Polyphobe 9831 | 6.25 | 6.25 | 6.25 | 6.25 |

Tamol 1124 is a commercial dispersant.
Triton CF-10 is a commercial surfactant
Ti-Pure R-706 is a tilanlum dioxide agent
Kathon LX is a commercial bactericide The grind paste was formulated into a paint by adding the respective emulsion per the following:

| Paint Formulation | | | | |
|---|---|---|---|---|
| Grind Paste (from above) Solids | 133.10 | 133.10 | 133.10 | 133.10 |
| Emulsion: (111.71 gms. @ 55%) | | | | |
| (Example 1) | 57.2 | | | 106.90 |
| (Example 2) | 55.3 | 111.10 | | |
| (Example 3) | 57.4 | | 107.04 | |
| (Example 4) | 60.3 | | | 101.89 |
| Water (22.92 gms. @ 55%) | | 23.53 | 27.59 | 32.74 | 27.73 |

TABLE 6

| Example | 2 | 3 | 4 | 1 |
|---|---|---|---|---|
| Minimum film forming Temperature ° C. | −0.9 | −0.9 | −0.5 | 2.0 |
| Block Resistance (ASTM D4946-89) 6 mil | | | | |
| 24 Hr. Dry - 1 hour R.T. 50% RH | 5–25% Seal; poor; 3 | 5–25% Seal; poor; 3 | 25–50% Seal; poor; 2 | Very slight to slight tack; good to very good; 7 |
| 24 Hr. Dry - 6 hours R.T. 50% RH | 50–75% Seal; very poor; 1 | 50–75% Seal; very poor; 1 | 75–100% Seal; very poor; 0 | Very slight to slight tack; good to very good; 7 |
| 24 Hr. Dry - 24 hours R.T. 50% RH | 50–75% Seal; very poor; 1 | 75–100% Seal; very poor; 0 | 75–100% Seal; very poor; 0 | Very slight to slight tack; good to very good; 7 |

TABLE 6-continued

| Example | 2 | 3 | 4 | 1 |
|---|---|---|---|---|
| 7 Day Dry - 1 hour R.T. 50% RH | Very tacky; no seal; poor to fair; 4 | Very tacky; no seal; poor to fair; 4 | Very tacky; no seal; poor to fair; 4 | Very slight tack; very good; 8 |
| 7 Day Dry - 6 hours R.T. 50% RH | Very tacky; no seal; poor to fair; 4 | Very tacky; no seal; poor to fair; 4 | Very tacky; no seal; poor to fair; 4 | Very slight tack; very good; 8 |
| 7 Day Dry - 30 min. 120 F. | 25–50% Seal; poor; 2 | 5–25% Seal; poor; 3 | 25–50% Seal; poor; 2 | Slight tack; good; 6 |
| Freeze-Thaw Stable | No | NO | No | Yes |

Best block resistance results have a value of 10, while poorest block resistance result in a value of 0. One generally requires block resistance values of from 7- to 10 on a scale of 1 to 10. High initial 24 hour block resistance is highly desired so that one can work with newly painted products. From the above, it is clear that the presence of any "conventional" APE surfactant in combination with water dispersible polyurethanes leads to drastic reduction in block resistance except in those situations where a polyoxyethylene/polyoxypropylene block copolymer is employed. However, the use of polyoxyethylene/polyoxypropylene block copolymers in combination with the water dispersible urethanes and, in the substantial absence of the APE surfactant, leads to a) stable emulsions; b) much improved block resistance and c) freeze-thaw stability. These properties are all obtained while maintaining low MFFT in the emulsion, a very unusual and surprising result.

EXAMPLE 7

VAE Prepared in the Presence of Polyurethane and Poly(oxyethylene) and Poly(oxybutylene) Block Copolymer The procedure of Example 1 was followed except that polyoxyethylene-polyoxybutylene-polyoxethylene triblock copolymers were substituted for the Pluronic copolymer blend. The triblock copolymers are available as Dow Polyol B40-1900 and B20-5000.

EXAMPLE 8

Semi-gloss Paints Prepared from VAE Emulsions

A series of VAE emulsions were prepared in accordance with the general procedure of Example 1. The stabilizer composition, levels thereof, and the utilization of a commercial wet adhesion monomer were varied. Table 7 sets forth the results.

TABLE 7

| Run | Blocking 1 day dry, 1 hour | Blocking 1 day dry, 6 hours | Blocking 1 day dry, 24 hours | Blocking 7 days dry, 30 min. @ 120 F. | F/T | PUR/ Surfactant content % (1) | WAM (2) | HEC (3) | Comment |
|---|---|---|---|---|---|---|---|---|---|
| 1 | 8 | 8 | 6 | 1 | P | 3.1/0 | | | |
| 2 | 9 | 7 | 5 | 1 | P | 3.0/0 | | | 0.4% Acrylic Acid |
| 3 | 5 | 3 | 0 | 0 | F | 1.1/2.0 | | | No Butyl Acrylate |
| 4 | 10 | 10 | 10 | 6 | P | 3.0/0 | X | | |
| 5 | 6 | 3 | 1 | 0 | P | 2.0/2.0 | | | |
| 6 | 9 | 5 | 5 | 3 | P | 1.2/2.0 | X | | |
| 7 | 4 | 3 | 1 | 0 | F | 0/3.0 | | | (4) |
| 8 | 10 | 9 | 8 | 6 | P | 3.0/0 | X | X | |
| 9 | 10 | 9 | 8 | 3 | P | 3.0/0.5 | | | |
| 10 | 10 | 9 | 8 | 5 | P | 3.0/1.0 | X | | |
| 11 | 9 | 9 | 8 | 5 | P | 3.0/2.0 | X | | |
| 12 | 8 | 6 | 5 | 3 | F | 1.2/2.0 | X | | (4) |
| 13 | 3 | 0 | 0 | 0 | F | 0/3.0 | | | |
| 14 | 3 | 0 | 0 | 0 | F | 0/3.0 | X | | |
| 15 | 9 | 9 | 8 | 3 | P | 2.0/0.8 | X | | |
| 16 | 9 | 9 | 4 | 4 | P | 2.0/0.8 | X | | |
| 17 | 9 | 9 | 9 | 5 | P | 3.0/0 | X | | |
| 18 | 9 | 8 | 7 | 7 | P | 3.0/0 | X | | Tg = −15 |
| 19 | 9 | 8 | 7 | 4 | P | 3.0/0 | X | | Tg = −11 |

Notes to Table
1. PUR/Surfactant Content: Amounts indicate weight percent of PUR and Surfactant, e.g., lgepal, relative to total monomer charged in initial mixture shown in Example 1.
2. WAM—represents wet adhesion monomer, if selected. These experiments contained 14.4 gms (% by weight) of the wet adhesion monomer allyl-N-methyl-N-β-(1-ethylene ureido)-ethyl carbamate (available from Air Products and Chemicals as WAM IV).
3. Natrosol 250 LR protective colloid is a brand derivative of hydroxycellulose.
4. Alternative polyols were used, i.e., poly(oxyethylene) and poly(oxybutylene) block copolymer and are available from Dow Chemical Corporation, as Dow Polyol B40-1900 and B20-5000 and were substituted for the Pluronic L64 and F68 copolymers respectively.

Discussion

In the above series of test results for satin paint formulations, one notices block resistance with the use of polyurethane stabilizers in combination with the Pluronic blend, and decreased when these stabilizers were substituted for standard alkylphenol ethoxylate type surfactants (see Run 1 vs. Run 5). The use of both wet adhesion monomer and polyurethane stabilizers in combination with the Pluronic blend also resulted in improved block resistance over the use of polyurethane without wet adhesion monomer (Run 1 vs. Run 4). Without polyurethane stabilizer in the stabilizer system, the use of wet adhesion monomer did not improve block resistance (Run 13 vs. Run 14). When the Pluronic blend was substituted for an alternative polyoxyethylene copolymer containing a polyoxybutylene segment, high block resistance was retained (Run 6 vs. Run 12) although freeze-thaw stability was sacrificed. Lowering glass transition temperature of the polyurethane stabilized latices by increasing the ethylene content of the polymer surprisingly also did not result in greatly decreased block resistance (Run 4 vs. Run 18).

Improved block resistance could also be obtained with some surfactant present in the combination of polyurethane and Pluronic block copolymer (Run 6). Without the Polyurethane or Pluronic copolymer, poor results were obtained (Run 14). Best results are obtained when the stabilizer consists essentially of polyurethane and Pluronic block copolymer.

What is claimed is:

1. In an aqueous based emulsion containing a vinyl acetate/ethylene polymer, said emulsion formed by the emulsion polymerization of vinyl acetate and ethylene, optionally including other ethylenically unsaturated monomers, in the presence of a stabilizing system wherein the improvement comprises:

said emulsion polymerization effected in the presence of a stabilizer system comprised of:
(a) a colloidal water dispersible nonionic polyurethane stabilizer comprised of the reaction product of a polyisocyanate and a hydrophilic component; and,
(b) a polyoxyethylene-polyoxyalkylene glycol.

2. The aqueous based vinyl acetate/ethylene emulsion polymer of claim 1 wherein the polyisocyanate component of said colloidal water dispersible nonionic polyurethane stabilizer is an aliphatic, aromatic or cycloaliphatic diisocyanate.

3. The aqueous based vinyl acetate/ethylene emulsion polymer of claim 2 wherein the polymer has a vinyl acetate concentration of from 60 to 95%, an ethylene concentration from 5 to 40% by weight of the polymer and from 0 to 15% by weight of other ethylenically unsaturated monomers.

4. The aqueous based vinyl acetate/ethylene emulsion polymer of claim 3 wherein the hydrophilic component of the polyurethane is a polyethyleneoxide or an adducts of polyethyleneoxides with water and/or alcohol.

5. The aqueous based vinyl acetate/ethylene emulsion polymer of claim 4 wherein the weight percentage of said water dispersible nonionic polyurethane and said polyoxyethylene-poly(oxyalkylene) glycols in said stabilizing system is from 15 to 75% colloidal water dispersible nonionic polyurethane and 85 to 25% polyoxyethylene-polyoxy(alkylene) glycol.

6. The aqueous based vinyl acetate/ethylene emulsion polymer of claim 5 wherein the polyisocyanate in said colloidal water dispersible nonionic polyurethane stabilizer is an aliphatic diisocyanate selected from the group consisting of tetramethylxylylene diisocyanate, isophorone diisocyanate, cyclohexane-1,4-diisocyanate, 4,4'-dicyclohexylmethane diisocyanate, 3,3-dimethyl-4,4-di(aminocyclohexyl)methane, hexamethylene diisocyanate and dodecamethylene diisocyanate.

7. The aqueous based vinyl acetate/ethylene emulsion polymer of claim 6 wherein the hydrophilic component in said colloidal nonionic polyurethane stabilizer is a polyethylene ether of a divalent alkanol having from 2–6 carbon atoms.

8. The aqueous based vinyl acetate/ethylene emulsion polymer of claim 7 wherein the number average molecular weight of the hydrophilic component employed in forming the colloidal water dispersible nonionic polyurethane is from 1000 to 20,000.

9. The aqueous based vinyl acetate/ethylene emulsion polymer of claim 8 wherein the number average molecular weight of the vinyl acetate/ethylene in the copolymer in the emulsion is from about 150,000 to 850,000 and the polymer consists essentially of vinyl acetate and ethylene and has less than 5% by weight of an ethylenically unsaturated monomer other than vinyl acetate and ethylene.

10. The aqueous based vinyl acetate/ethylene emulsion polymer of claim 7 wherein the stabilizing system employed in the emulsion polymerization is present in a proportion of from 3 to 10 percent by weight of the vinyl acetate employed in the emulsion polymerization.

11. The aqueous based vinyl acetate/ethylene emulsion polymer of claim 10 wherein the polyoxyalkylene glycol is poly(oxypropylene) glycol.

12. The aqueous based vinyl acetate/ethylene emulsion polymer of claim 11 wherein the stabilizing system consists essentially of from 40–60% colloidal water dispersible nonionic polyurethane and from 60–40% of polyoxyethylene-polyoxypropylene block copolymer by weight.

13. The aqueous based vinyl acetate/ethylene emulsion polymer of claim 12 wherein the stabilizing system consists essentially of said colloidal nonionic polyurethane stabilizer and polyoxyethylene-polyoxypropylene block copolymer and said polyurethane is present in an amount of from 40 to 60 percent by weight and said polyoxyethylene-polyoxypropylene glycol is one in which the polyoxypropylene chain has a molecular weight of 1500 to 1800 and the polyoxyethylene content is from 40 to 50 percent of the total weight of the molecule, a polyoxypropylene having a cloud point of about 126–133° F. or a polyoxyethylene-- polyoxypropylene glycol in which the polyoxypropylene chain has a molecular weight of 1500 to 1800 and the polyoxyethylene content is from 80 to 90 percent of the total weight of the molecule and having a cloud point of about 212° F.

14. The aqueous based vinyl acetate/ethylene emulsion polymer of claim 13 wherein the polyisocyanate employed in said polyurethane stabilizer is tetramethylxylylene diisocyanate and the hydrophilic component is a polyethylene glycol.

15. The aqueous based vinyl acetate/ethylene emulsion polymer of claim 14 wherein a wet adhesion monomer selected from the group consisting of N-β-alkylaminoethyl ethylene urea and allyl-N-methyl-N-β-(1-ethylene ureido)-ethyl carbamate is included in the polymer.

16. The aqueous based vinyl acetate/ethylene emulsion polymer of claim 14 wherein butyl acrylate is included in the vinyl acetate/ethylene polymer.

* * * * *